Feb. 11, 1958

L. P. RAITIERE 2,822,727

WIDE ANGLE OPTICAL SYSTEM

Filed May 28, 1954

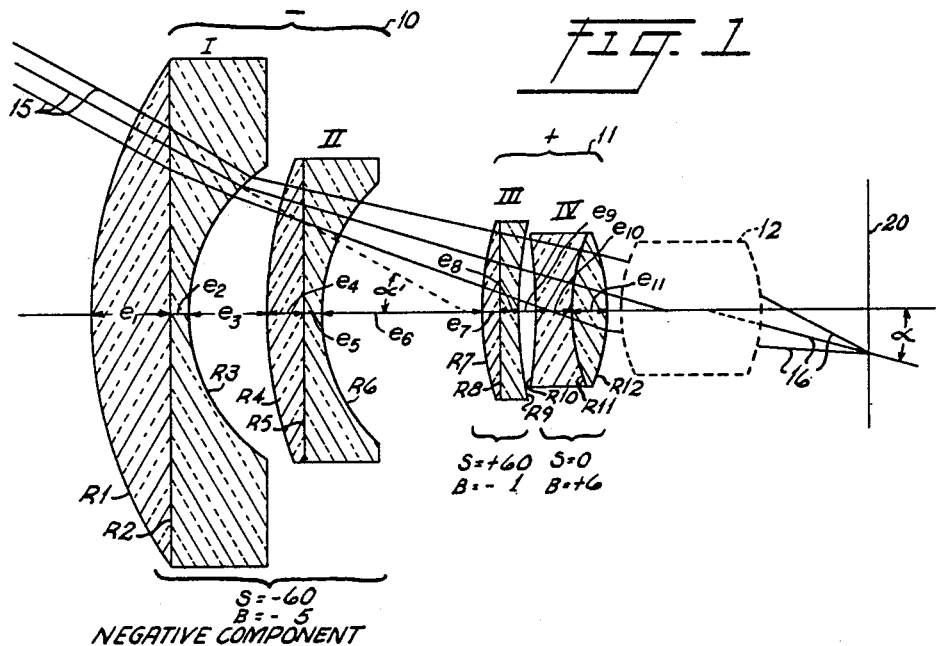

Fig. 1

NEGATIVE COMPONENT

| DOUBLET | RADII | THICKNESS | INDEX OF REFRACTION | DISPERSION |
|---|---|---|---|---|
| I | $R_1 = +87.214$ | $e_1 = 15$ | $n_{D_1} = 1.75060$ | $V = 27.7$ |
| I | $R_2 = \infty$ | $e_2 = 3.8$ | $n_{D_2} = 1.69100$ | $V = 54.8$ |
| I | $R_3 = +34.447$ | $e_3 = 15$ | (AIR) | |
| II | $R_4 = +75.500$ | $e_4 = 7.8$ | $n_{D_4} = 1.75060$ | $V = 27.7$ |
| II | $R_5 = \infty$ | $e_5 = 3$ | $n_{D_5} = 1.69100$ | $V = 54.8$ |
| II | $R_6 = +34.447$ | $e_6 = 32$ | (AIR) | |

POSITIVE COMPONENT

| III | $R_7 = +58.465$ | $e_7 = 3$ | $n_{D_7} = 1.617$ | $V = 54.9$ |
|---|---|---|---|---|
| III | $R_8 = \infty$ | $e_8 = 3$ | $n_{D_8} = 1.617$ | $V = 36.6$ |
| III | $R_9 = +87.697$ | $e_9 = 3.6$ | (AIR) | |
| IV | $R_{10} = -106.400$ | $e_{10} = 7$ | $n_{D_{10}} = 1.65446$ | $V = 33.8$ |
| IV | $R_{11} = +39.210$ | $e_{11} = 7$ | $n_{D_{11}} = 1.58267$ | $V = 46.5$ |
| IV | $R_{12} = -41.177$ | | | |

Fig. 2

INVENTOR.
LOUIS P. RAITIERE

BY
ATTORNEY.

United States Patent Office 2,822,727
Patented Feb. 11, 1958

2,822,727

WIDE ANGLE OPTICAL SYSTEM

Louis P. Raitiere, Pleasantville, N. Y., assignor to General Precision Laboratory Incorporated, a corporation of New York Application May 28, 1954, Serial No. 432,961

5 Claims. (Cl. 88—57)

This invention relates to a lens system and particularly to a wide angle attachment for photographic objectives, for decreasing the focal length and increasing the angle of field. More specifically, the invention relates to an afocal anamorphic lens system for attachment to motion picture cameras and projectors for changing the aspect ratio of the projected images.

In order to improve the naturalness of motion pictures it is desirable to present scenes with a versatility regarding aspect ratio which is compatible with the scenes. In other words, sometimes it is desirable to present scenes where the field is wider horizontally than vertically, or vice versa. One way of accomplishing this end result is to photograph a scene on a single film strip through an optical system having a field which is wider in one dimension than the other and then project the pictures with a projector having a similar objective system to restore the image of the scene to its normal proportions. Therefore, it is desirable to be able to change readily the anamorphic properties of the camera and/or the projector so that the presentation of the pictures will be compatible with the scenes as photographed.

The present invention provides an improved optical attachment which can be applied to either a camera or a projector and be adjusted in a manner compatible with the requirements of the manner of presenting the scenes.

Anamorphic lens systems for accomplishing this end result are already known in the art. However, these prior art systems usually have serious errors of distortion so that in situations where the action crosses the scene the differences in magnification become quite apparent with the result that the scenes do not appear life-like.

The primary object of the present invention is to provide an improved lens system which will be corrected for spherical and chromatic aberration, coma, astigmatism, and distortion.

Another object is to provide an improved afocal anamorphic optical system having the improvements indicated above.

Another object is to provide improved afocal optical systems of the types mentioned above which are adapted to serve as attachments for cameras and projectors having conventional wide aperture and short equivalent focal length objectives in order to provide an aspect ratio on the screen different from the aspect ratio on the film but with the scene in its normal undistorted proportions.

A specific object is to provide such improved lens systems in which the ratio of the tangent of the incident ray angle to the emergent ray angle is substantially constant for all incident rays, thereby substantially eliminating distortion.

Other and further objects will become readily apparent from the following description when considered in connection with the accompanying drawings in which:

Figure 1 is a cross sectional view of a novel optical system in accordance with the invention; and Figure 2 is a chart giving constructional data for one embodiment.

The embodiment of the invention shown is particularly adapted as an attachment to be placed in front of the conventional spherical camera objective system 12 shown in dotted outline in Fig. 1. Basically, the invention comprises an optical system having a negative component 10 and a positive component 11 the characteristics of which are so related, as hereinafter described, to provide an afocal anamorphic optical system of unusually wide aperture and very short effective focal length and without any substantial distortion.

When the invention is applied as an attachment to the conventional camera lens system, the stop of the camera serves as the stop for the system. The present system is so designed that all the incident light rays 15 will be focussed on the film strip 20, as represented by the emergent rays 16.

The distance between the lens system attachment and the original objective 12 may be varied without affecting the magnification. However if the full area on the film strip 20 is to be filled, the rays of light leaving the attachment and falling on the front surface of the objective must fill a cone whose apex lies approximately in the entrance pupil of the objective and whose vertex angle is equal to the maximum useful field angle of the original objective 12. It is evident that the greater the distance from the objective 12, the greater the aperture the attachment must have if the base of this cone of light is not to be occluded by the attachment. The overall magnification $m$, produced by the afocal attachment, independent of the E. F. L. of the conventional lens is $$m = \frac{\tan \alpha'}{\tan \alpha} \qquad (1)$$

The negative component 10 comprises two divergent menisci doublets I and II, each of which have their convex surfaces toward the incident light 15. The positive component comprises a pair of convergent menisci doublets III and IV. The convex surface of meniscus doublet III is toward the incident light 15 while the convex surface of the meniscus doublet IV is toward the opposite direction. Each of the lens elements of the doublets I, II and III have plano cemented surfaces and this effectively reduces the cost of making the surfaces as well as making it much easier to make the generatrices of the cylindrical surfaces parallel to each other. While the cemented surfaces of the meniscus doublet IV are not plano they are of shallow curvature and of such value as to make it possible to control the final overall characteristics of the system. In all of the menisci doublets the generatrices of the cylindrical surfaces are at right angles to the plane of the drawing so that the system has zero power in the plane common to the optical axis and the generatrices, while the power in the plane normal to the optical axis and parallel to the generatrices is the ratio of tangent $\alpha'$ of the incident ray 15 to tangent $\alpha$ of the corresponding emergent ray 16. In this embodiment this ratio is substantially 2.

The important feature of this invention is that this magnification ratio remains substantially constant, that is, within a range of approximately 1.95 to 2.05 throughout the field of the system and therefore there is substantially no distortion. This is accomplished by the novel association of the particular lens components in the combination herein disclosed.

In general, the negative component 10 has a high coefficient of 3rd order spherical aberration, S, and a high coefficient of 3rd order coma, B, with low coefficient of 3rd order astigmatism, A. The effective focal length of doublet I is substantially equal to the effective focal length of doublet II and the intervening air gap is a practical minimum.

The thickness of the glass and air gaps are important as is well known. However, from the basic principles set forth herein and the one example of a successful embodiment given in the constructional data chart one skilled in the art could readily determine the air spaces to correspond to any slight changes in curvature of the lens surfaces within the purview of the present invention.

Construction data for one practical embodiment of the present invention is as shown in the following chart:

NEGATIVE COMPONENT

| Doublet | Radii | Thickness | Index of refraction | Dispersion |
|---------|-------|-----------|---------------------|------------|
| I | $R_1=+\ 87.214$ | $e_1=15$ | $n_{D_1}=1.75060$ | $V=27.7$ |
|   | $R_2=\infty$ | $e_2=3.8$ | $n_{D_2}=1.69100$ | $V=54.8$ |
|   | $R_3=+\ 34.447$ | $e_3=15$ | (Air) | |
| II | $R_4=+\ 75.500$ | $e_4=7.8$ | $n_{D_4}=1.75060$ | $V=27.7$ |
|    | $R_5=\infty$ | $e_5=3$ | $n_{D_5}=1.69100$ | $V=54.8$ |
|    | $R_6=+\ 34.447$ | $e_6=32$ | (Air) | |

POSITIVE COMPONENT

| Doublet | Radii | Thickness | Index of refraction | Dispersion |
|---------|-------|-----------|---------------------|------------|
| III | $R_7=+\ 58.465$ | $e_7=3$ | $n_{D_7}=1.617$ | $V=54.9$ |
|     | $R_8=\infty$ | $e_8=3$ | $n_{D_8}=1.617$ | $V=36.6$ |
|     | $R_9=+\ 87.697$ | $e_9=3.6$ | (Air) | |
| IV | $R_{10}=-106.400$ | $e_{10}=7$ | $n_{D_{10}}=1.65446$ | $V=33.8$ |
|    | $R_{11}=+\ 39.210$ | $e_{11}=7$ | $n_{D_{11}}=1.58267$ | $V=46.5$ |
|    | $R_{12}=-\ 41.177$ | | | | where R with the appropriate subscript represents the respective radii of curvature of the boundary surfaces of the lens system of Fig. 1; $e$, with the appropriate subscript represents the distances between the respective boundary surfaces in order from front to rear; $n_D$ is the index of refraction for the D line of the spectrum; and V is the coefficient of dispersion.

In this connection, in the constructional data chart given in Fig. 2 and in the table of values given in the chart immediately above, the thickness ($e$ with the appropriate subscript) refers to the thickness of glass as well as to the thickness of air between adjacent glass surfaces and is measured from left to right from the glass surface designated by the corresponding subscript of R. For example, $e_1$ is the thickness of glass of outer segment of doublet I, that is, the thickness between $R_1$ and $R_2$; $e_2$ is the thickness of glass between $R_2$ and $R_3$; $e_3$ is the thickness of air between $R_3$ and $R_4$; etc.

The spherical aberration, S, of the negative component 10 is inherently negative and the coefficient of coma, B, is negative by reason of the "bending" or "warping" of the doublets I and II with their convex surfaces toward the incident light rays 15. Herein the value of bending, $\gamma$, of any arbitrary lens is defined as $$\gamma = \tfrac{1}{2}(\rho_1+\rho_2) \qquad (2)$$

where $\rho_1$ and $\rho_2$ are the curvatures of the respective external surfaces of the lens.

In accordance with this invention, if an E. F. L. of $+1$ is selected for the positive component 11 and a value of $-0.50$ is selected for the negative component 10, the Seidel coefficient of the 3rd order aberrations will be: for the spherical aberration, S, of the negative component 10, between $-60$ and $-100$, for the coma, B, of the negative component 10, between $-4.0$ and $-6.0$ and the Seidel coefficient for the tangential image will be between 0 and $-0.3$. These relative values have been found to give good results because the distortion decreases when the spherical aberration and the negative coma increases, and the astigmatism is small. The menisci doublets I and II of the negative component 10 have about the same power and the same positive bending.

The embodiment illustrated is an afocal system and accordingly the Seidel coefficient of the saggital image does not need to be considered. However, it should be understood that the principles disclosed herein are applicable to spherical surface lens systems as well as to the anamorphic lens system described herein. The feature which would be common to either system is the substantial absence of distortion.

The indices of refraction of the glass in the doublets I and II of the negative component 10 are preferably higher than 1.66 and the differences between the indices of the glass in each doublet is smaller than 0.06. The coefficients of dispersion are so chosen as to correct chromatic aberration for both doublets when the cemented surfaces are flat.

The doublets III of the positive component have low positive power of substantially $+0.35$ on the basis of unity power for the positive component 11. The positive power of the doublet IV is substantially $+0.70$. The doublet III has a coefficient of spherical aberrration high enough to neutralize all but about $\tfrac{1}{10}$ of the spherical aberration of the negative component 10, and the spherical aberration of the doublet IV substantially cancels the remaining part. The coefficient of coma of the doublet III is negative, the same sign as that of the coma of the negative component 10 and of such value that when added algebraically to the coefficient of coma of the negative component 10 the sum total cancels the coefficient of coma of the doublet IV of the positive component.

By splitting the positive component 11 into the two doublets III and IV the coma is corrected by giving the doublets different powers, while other factors are selected to correct spherical aberration and astigmatism. To correct astigmatism it is necessary to have a factor of symmetry. Since the warping of the doublets III and IV is of opposite sign, astigmatism could be completely concelled by giving them equal powers but this would make it impossible to correct the coma. In accordance with this invention, the coma of the system is corrected by giving the doublets III and IV different powers, as mentioned above and by using for the respective lens elements of the doublet IV glasses whose indices of refraction differ by an amount greater than 0.06 and by using for III glasses having the same index of refraction, $n_D$, since for a doublet of a given focal length and coefficient of spherical aberration, the coma increases with the difference in indices of the glasses. The indices of the glasses are so chosen as to give the difference in powers as indicated above and the required dispersions necessary to correct chromatic aberration determines the types of glass.

What is claimed is:

1. A wide angle optical system for supplementing the objective of a camera and projector, said system comprising a positive component and a negative component, each of said components including two doublet menisci, the two menisci of said negative component and the inner meniscus of said positive component having their convex surfaces toward the incident light from the object and the outer meniscus of said positive component having its convex surface toward the opposite direction, said optical system providing an afocal anamorphic optical system adapted to be operatively positioned before the objective of a camera and projector, the spherical aberration of said negative component being within the range from $-60$ to $-100$, the coefficient of coma for said negative component being within the range from $-4.0$ to $-6.0$, and the spherical aberration and coma of said positive component being such as to substantially cancel those aberrations of the negative component.

2. The combination as set forth in claim 1 in which said doublets have substantially the same power and the same negative bending, and in which the cemented surfaces are flat.

3. The combination as set forth in claim 2 in which the ratio between effective focal length of said negative component and that of the said positive component is equal to the magnification of the system.

4. A wide angle optical system for supplementing the objective of a camera and of a projector, said system comprising a positive component and a negative component optically aligned and approximately afocally spaced, the ratio between the effective focal lengths of the respective positive and negative components being equal to the magnification, each of said components including two doublet menisci, the two menisci of said negative component and the inner meniscus of said positive component having their convex surfaces toward the incident light from the object and the outer meniscus of said positive component having its convex surface toward the opposite direction, the coefficient of 3rd order spherical aberration of said negative component being within the range from —60 to —100, the coefficient of 3rd order coma for said negative component being within the range from —4.0 to —6.0, the indices of refraction of said negative component doublets being not less than substantially 1.66 with the differences between the indices of the respective doublets being substantially 0.06 or less, the power of said inner doublet of said positive component being substantially one-half that of the outer doublet of said positive component, the indices of the glass of said inner doublet of said positive component being substantially the same while the difference between the indices of the glass of the outer doublet of said positive component is less than .06.

5. A wide angle attachment for a camera or projector objective comprising positive and negative components in accordance with the constructional data in the following chart:

NEGATIVE COMPONENT

| Doublet | Radii | Thickness | Index of refraction | Dispersion |
|---|---|---|---|---|
| I | $R_1=+\ 87.214$ | $e_1=15$ | $n_{D_1}=1.75060$ | $V=27.7$ |
|  | $R_2=\infty$ | $e_2=3.8$ | $n_{D_2}=1.69100$ | $V=54.8$ |
|  | $R_3=+\ 34.447$ | $e_3=15$ | (air) |  |
|  | $R_4=+\ 75.500$ | $e_4=7.8$ | $n_{D_4}=1.75060$ | $V=27.7$ |
| II | $R_5=\infty$ | $e_5=3$ | $n_{D_5}=1.69100$ | $V=54.8$ |
|  | $R_6=+\ 34.447$ | $e_6=32$ | (air) |  |

POSITIVE COMPONENT

| Doublet | Radii | Thickness | Index of refraction | Dispersion |
|---|---|---|---|---|
| III | $R_7=+\ 58.465$ | $e_7=3$ | $n_{D_7}=1.617$ | $V=54.9$ |
|  | $R_8=\infty$ | $e_8=3$ | $n_{D_8}=1.617$ | $V=36.6$ |
|  | $R_9=+\ 87.697$ | $e_9=3.6$ | (air) |  |
|  | $R_{10}=-106.400$ | $e_{10}=7$ | $n_{D_{10}}=1.65446$ | $V=33.8$ |
| IV | $R_{11}=+\ 39.210$ | $e_{11}=7$ | $n_{D_{11}}=1.58267$ | $V=46.5$ |
|  | $R_{12}=-\ 41.177$ |  |  |  | where R with the appropriate subscript represents the respective radii of curvature of the boundary surfaces of the lens system of Fig. 1; $e$, with the appropriate subscript represents the distances between the respective boundary surfaces in order from front to rear, $n_D$ is the index of refraction for the D line of the spectrum; and V is the coefficient of dispersion.

References Cited in the file of this patent

UNITED STATES PATENTS

| | | |
|---|---|---|
| 1,578,259 | Boegehold | Mar. 10, 1926 |
| 1,584,271 | Bertele | May 11, 1926 |
| 1,584,272 | Bertele | May 11, 1926 |
| 1,802,099 | Wolfe | Apr. 21, 1931 |
| 1,863,099 | Bowen | June 14, 1932 |
| 1,910,492 | Mellor | May 23, 1933 |
| 1,934,561 | Rayton | Nov. 7, 1933 |
| 1,955,590 | Lee | Apr. 17, 1934 |
| 2,317,790 | Mellor | Apr. 27, 1943 |
| 2,324,057 | Bennett | July 13, 1943 |
| 2,582,085 | Tolle | Jan. 8, 1952 |
| 2,612,077 | Albrecht | Sept. 30, 1952 |

FOREIGN PATENTS

| | | |
|---|---|---|
| 730,867 | France | May 23, 1932 |